US006831550B2

(12) United States Patent
Orita et al.

(10) Patent No.: US 6,831,550 B2
(45) Date of Patent: Dec. 14, 2004

(54) SECURITY SYSTEM USING SENSORS

(75) Inventors: Kouji Orita, Utsunomiya (JP); Takehiro Orita, Utsunomiya (JP); Kimito Kuriuchi, Utsunomiya (JP)

(73) Assignee: Nihondensikougaku Co., Ltd. (JP)

( * ) Notice: Subject to any disclaimer, the term of this patent is extended or adjusted under 35 U.S.C. 154(b) by 243 days.

(21) Appl. No.: 10/290,509

(22) Filed: Nov. 8, 2002

(65) Prior Publication Data

US 2003/0102963 A1 Jun. 5, 2003

(30) Foreign Application Priority Data

Nov. 9, 2001 (JP) ....................................... 2001-344305

(51) Int. Cl.[7] ............................................... H04M 11/04

(52) U.S. Cl. ............... 340/310.01; 340/500; 340/539.1; 340/541

(58) Field of Search ........................... 340/310.01, 500, 340/506, 541, 507, 545.9, 568.2, 3.44, 5.2, 521, 539.1, 501

(56) References Cited

U.S. PATENT DOCUMENTS

| | | | | | |
|---|---|---|---|---|---|
| 4,603,318 | A | * | 7/1986 | Philp | 340/310.01 |
| 5,798,692 | A | * | 8/1998 | Crispie et al. | 340/501 |
| 5,977,913 | A | * | 11/1999 | Christ | 342/465 |
| 6,396,391 | B1 | * | 5/2002 | Binder | 340/310.01 |

* cited by examiner

*Primary Examiner*—Phung Nguyen
(74) *Attorney, Agent, or Firm*—Connolly, Bove, Lodge & Hutz LLP

(57) ABSTRACT

In a security system using sensors that includes clock-equipped surveillance terminals for sending security data to a surveillance center, one surveillance terminal uses a power supply line to send a time calibration signal to the other surveillance terminals at appropriate times, the surveillance terminals use the signal to eliminate time error among their clocks, the other surveillance terminal use the power supply line to send to the one surveillance terminal time-stamped data, and the one surveillance terminal discriminates operating states of the other surveillance terminals by comparing the receive time and send time of time-stamped data.

5 Claims, 5 Drawing Sheets

SECURITY SYSTEM USING SENSORS

BACKGROUND OF THE INVENTION

1. Field of the Invention

This invention relates to a security system using sensors.

2. Background Art

A well-known security system using sensors consists of sensors installed at a number of security zones, surveillance terminals installed at the respective security zones for forwarding security data based on the operation of the sensors, and a surveillance center for monitoring the individual security zones utilizing the security data received from the surveillance terminals.

Each of the conventional surveillance terminals used in this type of security system is configured to send prescribed security data to the security surveillance center via a telephone line or the like in response to the outputs of window sensors, door sensors, glass shatter sensors, infrared (body heat) sensors and/or various other sensing devices for detecting the intrusion of unauthorized persons into a prescribed security zone demarcated in, for example, a shop, store, financial institution, office or other such location. The surveillance center uses the security data to monitor intrusion of unauthorized persons into security zones.

When a surveillance terminal incorporated in the conventional security system using sensors of the foregoing structure breaks down or experiences a malfunction, security data that the surveillance terminal installed at a monitored facility should immediately send to the surveillance equipment at the surveillance center in response to sensor signals etc. is liable to arrive at the surveillance center late, so that the surveillance center does not receive the required security data at the required time, or not to be transmitted at all.

Since the conventional security system using sensors does not check whether received security and other data arrived after a delay, an intrusion detected by the sensors at a monitored facility may not be ascertained by the security surveillance center till considerably later. The scale of the loss owing theft and the like is therefore likely to increase beyond that had the intrusion been immediately discerned. This is a serious problem from the standpoint of system reliability

SUMMARY OF THE INVENTION

One object of the present invention is therefore to provide a security system using sensors that overcomes the aforesaid problems of the prior art.

Another object of the present invention is to provide a security system using sensors that has enhanced reliability.

Another object of the present invention is to provide a security system using sensors that achieves improved reliability by enabling all surveillance terminals of the system to share accurate time data.

The present invention achieves this object by providing a security system using sensors comprising: multiple surveillance terminals each equipped with a clock and adapted to send security and other data over a power supply line and a surveillance center for monitoring prescribed security zones utilizing security data received from the surveillance terminals, wherein at least one surveillance terminal among the multiple surveillance terminals uses the power supply line to send a time calibration signal to required ones of the other surveillance terminals at appropriate times, the surveillance terminals receiving the time calibration signal use the signal to correct their clocks to eliminate time error among the clocks of the multiple surveillance terminals, each surveillance terminal uses the power supply line to send to a prescribed surveillance terminal time-stamped data created by adding to the security and other data it sends send-time data indicating the time at which the data was sent, and the prescribed surveillance terminal discriminates operating states of the surveillance terminals by comparing receive time and send time of time-stamped data.

The operating state of a surveillance terminal can be assessed based on whether or not the time difference between the send time of the time-stamped data sent by the surveillance terminal and the time when the time-stamped data was actually received is greater than a prescribed value. The result of the assessment can be output by displaying it on an appropriate visual display means or announcing it as a voice message. Otherwise, a configuration can be adopted that sends the result of the assessment from the surveillance terminal to the surveillance center.

The clocks of the surveillance terminals are calibrated at appropriate times based on the time calibration signal. Since the surveillance terminals can therefore share the same time data, the time comparison can be made with very high, split-second order accuracy.

The accuracy of the time calibration can be enhanced by utilizing a standard radio signal carrying time data that traces back to a national standard. This can be achieved by installing in one of the surveillance terminals a receiver for receiving the standard radio signal, deriving a time calibration signal including standard time data from the standard radio signal, and sending the time calibration signal to the other surveillance terminals via the power supply line.

In another configuration of the security system, the individual surveillance terminals are equipped with power-line carrier (PLC) transceivers they use to exchange various data with one another over the power supply line.

DESCRIPTION OF THE PREFERRED EMBODIMENT

Figure 1:
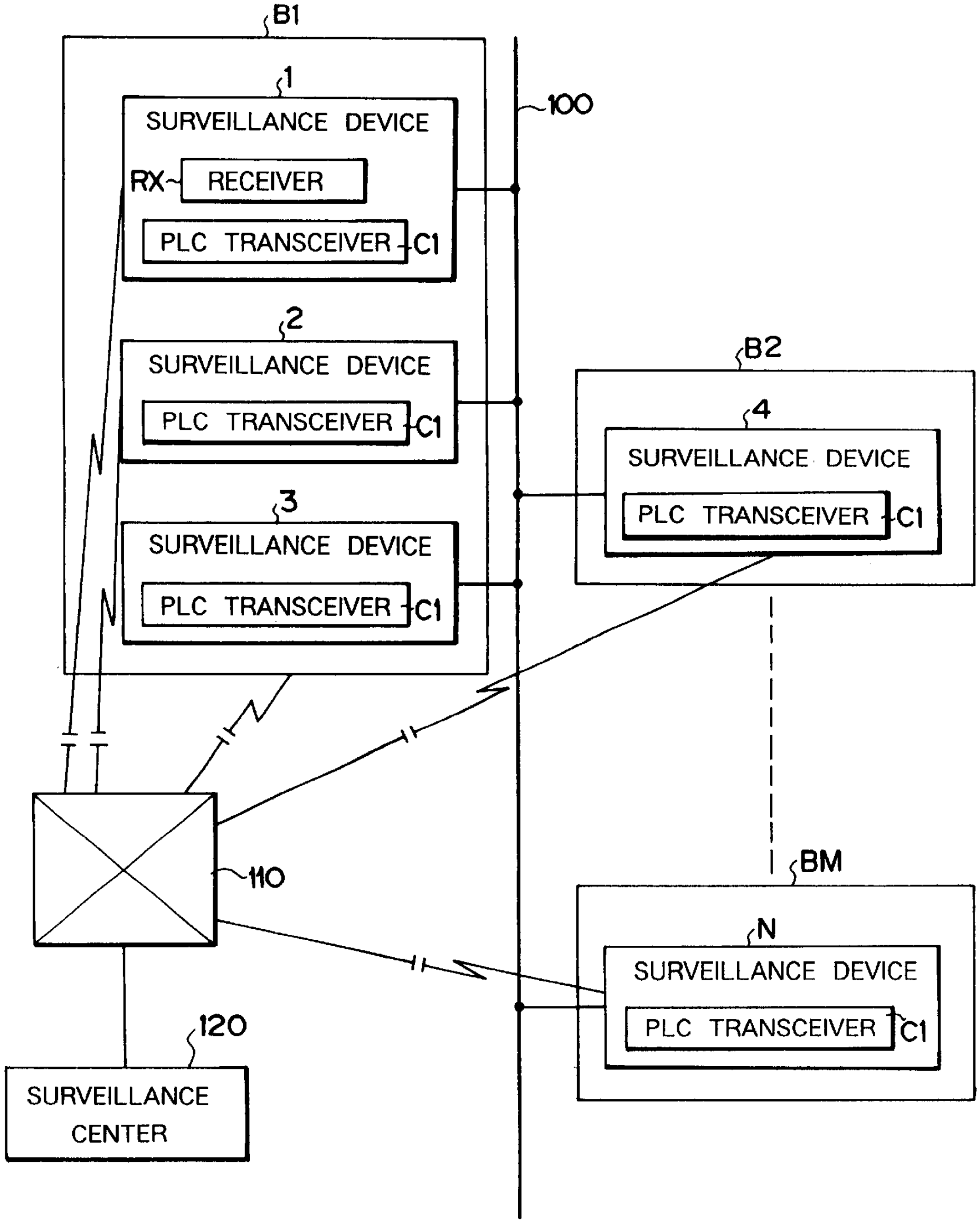
FIG. 1 is a system diagram showing a security system using sensors that is an embodiment of the present invention.

FIG. 1 is a system diagram showing an embodiment of the invention security system using sensors that is configured to check whether or not surveillance terminals are operating normally. The symbols 1, 2, . . . N in FIG. 1 designate surveillance terminals installed in the same commercial power supply block. As shown in the drawing, the surveillance terminals 1–N are installed in buildings B1, B2, . . . BM T, which are factories, offices, supermarkets and other such facilities to be monitored by the security system. Reference numeral 100 designates a distribution line (power supply line) for supplying commercial ac 100 V electric power to buildings. The surveillance terminals 1–N are supplied with the power they require from the distribution line 100. The surveillance terminals 1–N are thus interconnected by the distribution line 100. It should be noted, however, that the power source for the surveillance terminals 1–N need not necessarily be the distribution line 100 but can instead be a battery or the like.

In the present embodiment, the surveillance terminal 1 is configured as a master terminal and the surveillance terminals 2–N are configured as slave terminals. This is for enabling the surveillance terminals 1–N to carry out operational checks among themselves. In addition, surveillance devices 1–N are connected to a surveillance center 120 through a public telephone circuit network 110 used for exchanging required data with the surveillance center 120.

In order to enable the multiple surveillance terminals 1–N encompassed by the security system using sensors to share accurate time data, the surveillance device 1 configured as the master terminal is equipped with a receiver RX for receiving wirelessly transmitted standard time data. The surveillance terminal 1 can continually utilize the standard time data received by the receiver RX. In addition, the receiver RX at appropriate times sends the received standard time data through the distribution line 100 to the surveillance terminals 2–N configured as slave terminals. The sending and receiving of the standard time data is conducted using a PLC technology. Each of the surveillance terminals 1–N is therefore equipped with a PLC transceiver C1 for data communications utilizing PLC. Since the PLC transceivers C1 are all connected to the distribution line 100, they can exchange required data via the distribution line 100.

Figure 2:
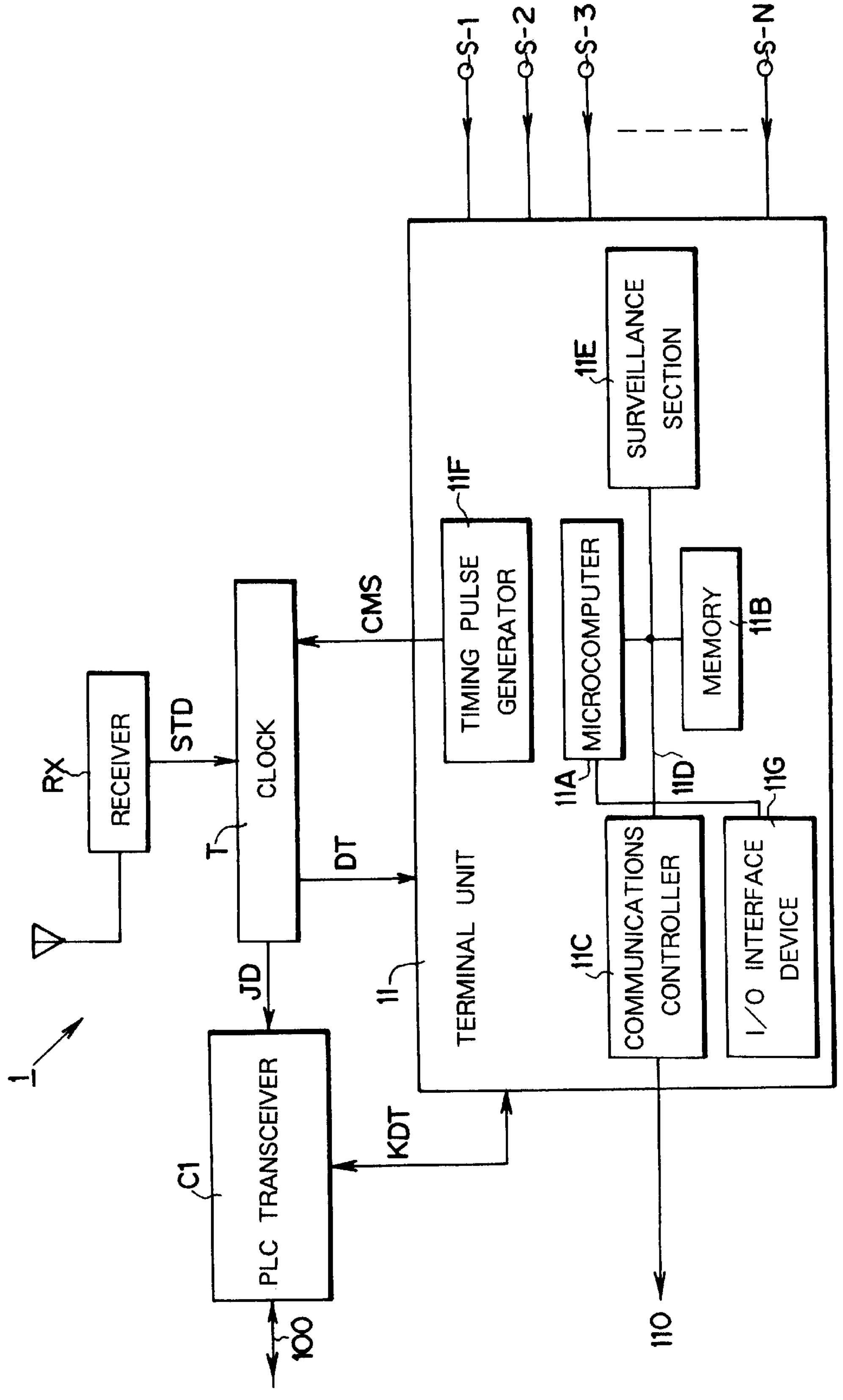
FIG. 2 is a detailed block diagram of a surveillance terminal that serves as a master terminal in the system of FIG. 1.

FIG. 2 is a detailed block diagram of the surveillance terminal 1 shown in FIG. 1. The surveillance terminal 1 includes a processing unit 11 equipped with multiple intrusion sensors S-1–S-N installed at windows, doors, rooms etc. in the demarcated security zone of the building B1 and with a microcomputer 11A that receives and processes the output signals of the intrusion sensors S-1–S-N, and also includes a clock T.

The terminal unit 11 also has a memory 11B and communications controller 11C The microcomputer 11A, memory 11B and communications controller 11C are interconnected by a data bus 11D The communications controller 11C is connected to the public telephone circuit network 110, which it uses to exchange data required for security surveillance between the surveillance terminal 1 with the surveillance center 120 and other external devices. The microcomputer 11A is able to communicate through an I/O interface device 11G with the PLC transceiver C1, the clock T and sensors S-1–S-N.

The clock T is a time data generator constituted as a crystal clock, i.e., a clock that measures time using a crystal oscillator. The clock T outputs time data DT indicating the time at that instant. The time data DT is sent to the processing unit 11.

The processing unit 11 is responsive to the time data DT and the output signals of the intrusion sensors S-1–S-N. When any of the intrusion sensors S-1–S-N produces a signal, the processing unit 11 adds the time data DT at that time to the output data from the sensor producing the signal and stores the combined data in the memory 11B of the processing unit 11. This process is repeated successively for successive sensor signals. Thus when it is later desired to check how and when each of the intrusion sensors S-1–S-N operated, this can be accomplished by reading the pertinent data from the memory 11B. The entry and escape routes of the intruder(s) can therefore be analyzed with good accuracy.

In order to ensure that this analysis can be performed with split second accuracy, the receiver RX provided in the surveillance terminal 1 is required to be one that can receive a standard radio signal that traces back to a national standard based on an atomic clock and can extract highly accurate standard time data STD from the received signal.

Figure 3:
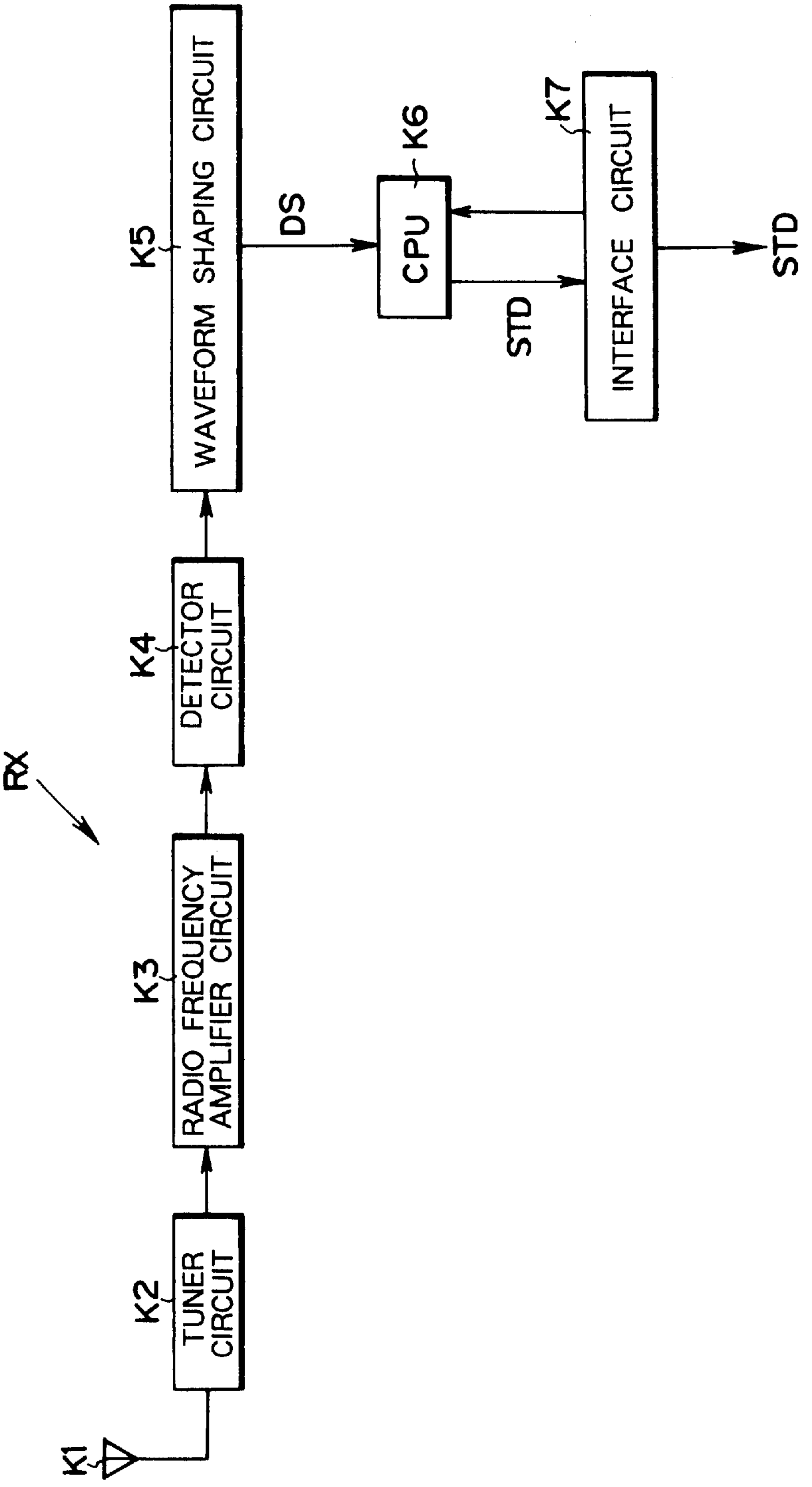
FIG. 3 is a block diagram showing the configuration of a receiver shown in FIG. 2

FIG. 3 is a block diagram showing the configuration of the receiver RX. Reference symbol K1 in FIG. 3 designates an antenna; K2 a tuner for tuning to a standard radio signal, K3 a radio frequency amplifier for amplifying the weak standard radio signal selected by the tuner K2; K4 a detector for demodulating the standard radio signal to extract the standard time data signal component thereof; and K5 a waveform shaping circuit that produces a digital signal DS representing the standard time.

The digital signal DS is forwarded to a microprocessor (CPU) K6 that processes it to produce the standard time data STD representing the standard time carried by the received standard radio signal. The standard time data STD is sent to the clock T through an interface K7.

The explanation will now be continued with reference to FIG. 2. The clock T is of a conventional type that responds to input of the time calibration command signal CMS from the processing unit 11 by performing time calibration using the standard time data STD received from the receiver RX. The time calibration is performed by overwriting the time data produced in the clock T with the standard time data STD.

The time calibration in the clock T is carried out in response to a time calibration command signal CMS received from the processing unit 11. In this embodiment, the processing unit 11 is equipped with a timing pulse generator 11F for outputting a pulse once every hour. The pulse output by the timing pulse generator 11F is used as the time calibration command signal CMS. Alternatively, a configuration can be adopted in which a program loaded in the microcomputer 11A produces the time calibration command signal CMS once every hour. Moreover, when the time calibration command signal CMS is produced by the computer program, it can be produced every hour on the hour, once every two hours, once every three hours, or at some other desired time interval.

When time calibration is performed in the clock T, the clock T outputs slave terminal calibration data JD containing the time calibration command signal CMS and the standard time data STD to the PLC transceiver C1 as a time calibration signal. The PLC transceiver C1 in turn outputs the substation calibration data JD onto the distribution line 100. The slave terminal calibration data JD is received by the surveillance terminals 2–N, which are slave terminals, and each of the surveillance terminals 2–N time-calibrates its clock based on the slave terminal calibration data JD.

The surveillance terminals (slave terminals) 2–N are equipped with PLC transceivers C1 (see FIG. 1). In the slave terminals, which are not equipped with receivers RX, the slave terminal calibration data JD that the surveillance terminal 1 sends onto the distribution line 100 is received by the associated PLC transceivers C1 As a result, the clocks of the surveillance terminals 2–N are time-calibrated.

Figure 4:
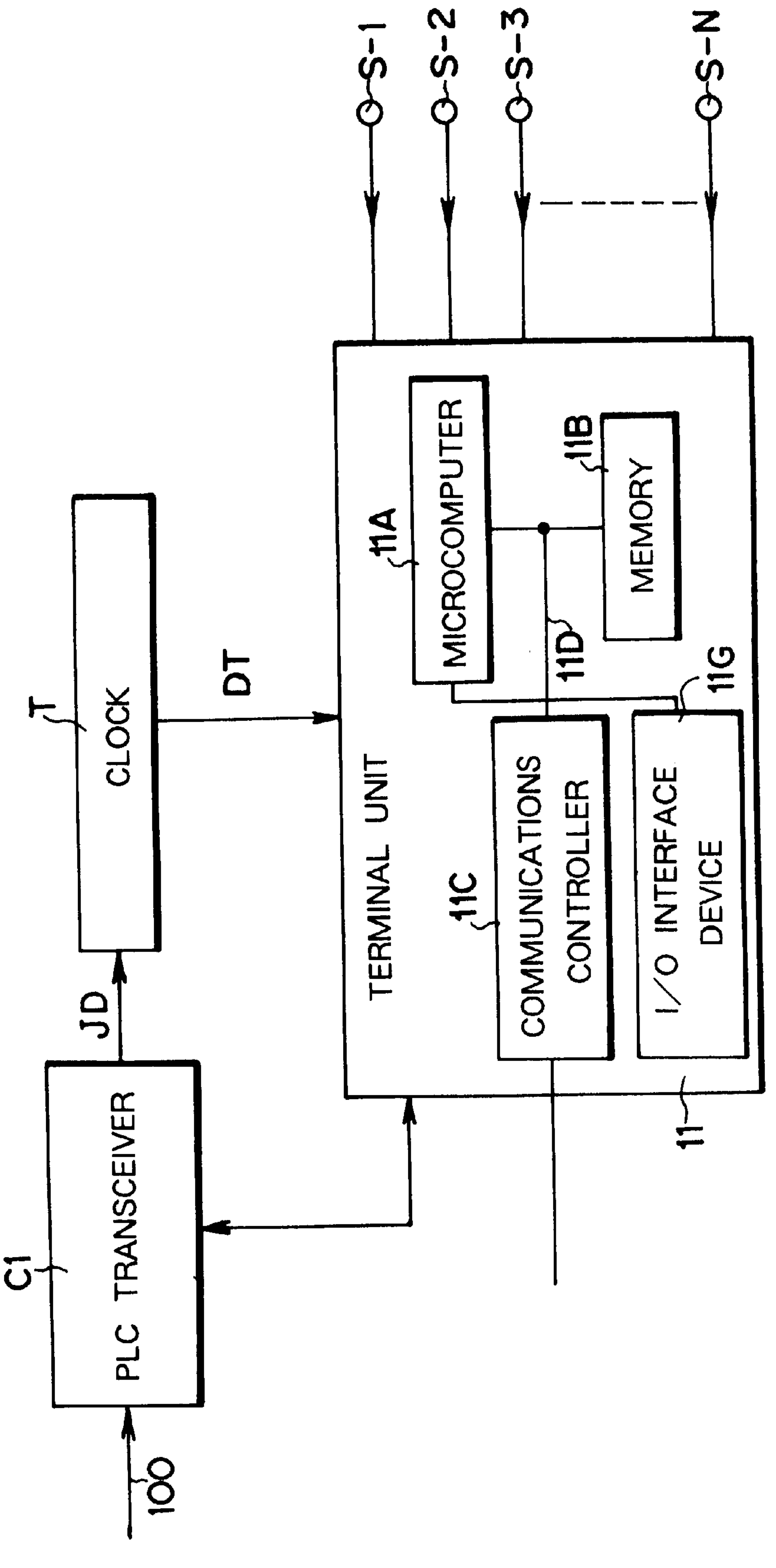
FIG. 4 is a detailed block diagram of a surveillance terminal that serves as a slave terminal in the system of FIG. 1.

FIG. 4 is a detailed block diagram of the surveillance terminal 2, which is a slave terminal. The surveillance terminal 2 is what is obtained by removing the receiver RX, the surveillance section 11E and the timing pulse generator 11F of the processing unit 11 from the surveillance terminal 1 of FIG. 2. As the remaining constituents of the surveillance terminal 2 shown in FIG. 4 are identical to those of the surveillance terminal 1, they are assigned the same reference symbols as those of FIG. 2 and will not be explained again here.

The PLC transceiver C1 of the surveillance terminal 2 receives the slave terminal calibration data JD sent from the surveillance terminal 1 via the distribution line 100 and forwards it to the associated clock T. The clock T then performs time calibration based on the time calibration command signal CMS and standard time data STD contained in the slave terminal calibration data JD. This time calibration operation is carried out in exactly the same way as that explained with reference to FIG. 2. As a result, the clock T in the surveillance terminal 2 can supply the associated processing unit 11 with very accurate time data DT.

The surveillance terminals 3–N (the other slave terminals) are identical in structure to the surveillance terminal 2 described above with reference to FIG. 4. The surveillance terminals 3–N can therefore also continually acquire accurate time data DT, meaning that all of the surveillance terminals 1–N can share the same accurate time data.

Since all of the surveillance terminals 1–N share the same accurate time data, the operation of the intrusion sensors S-1–S-N can be analyzed with split second accuracy. Moreover, as the time calibration can be optimally performed automatically, labor costs for time calibration can be substantially eliminated and system operating cost markedly reduced.

Owing to the fact that time calibration can be performed at any time by utilizing a standard radio signal, calibration of time discrepancy due to introduction of daylight saving time, return to standard time and insertion of a leap second can be automatically and almost instantaneously corrected in a single operation. Momentary degradation of system performance can therefore be prevented when time errors tend to arise owing to such events. The corollary is that maintenance costs can also be reduced.

On the other hand, when the security system using sensors is installed in association with an automatic business hour system, the reliability of the business hour system can be upgraded because the opening and closing times can be controlled with very high accuracy.

Reffering to FIG. 2, the surveillance section 11E is provided in the processing unit 11 of the surveillance terminal 1 so as to enable the surveillance terminal (master terminal) 1 to assess whether the surveillance terminals (slave terminals) 2–N are operating normally.

The processing unit 11 is constituted to be capable of exchanging data with the PLC transceiver C1. As explained in more detail later, the processing unit 11 receives time-stamped data KDT from the surveillance terminals (slave terminals) 2–N via the public telephone circuit network 110. The received time-stamped data KDT are sent to the processing unit 11 from where it is sent to the surveillance section 11E.

The surveillance terminals (slave terminals) 2–N operate in response to the time data DT and the output signals from the intrusion sensors S-1–S-N Specifically, when an intrusion sensor S-1–S-N associated with a surveillance terminal 2–N produces a signal, the surveillance terminal creates time-stamped data KDT by adding the current time data DT to the output data (signal) from the sensor concerned as send-time data indicating the time at which the output data was sent. It then immediately sends the time-stamped data KDT to the surveillance center 120 over the public telephone circuit network 110. It also simultaneously sends the time-stamped data KDT from the processing unit 11 to the PLC transceiver C1 from where it is sent out on the distribution line 100.

Similarly, the surveillance terminal 1 operates in response the time data DT and the output signals from the associated intrusion sensors S-1–S-N. Specifically, when an intrusion sensor S-1–S-N associated with the surveillance terminal 1 produces a signal, the surveillance terminal creates time-stamped data KDT by adding the current time data DT to the output data (signal) from the sensor concerned as send-time data indicating the time at which the output data was sent. It then immediately sends the time-stamped data KDT to the surveillance center 120 over the public telephone circuit network 110.

Figure 5:
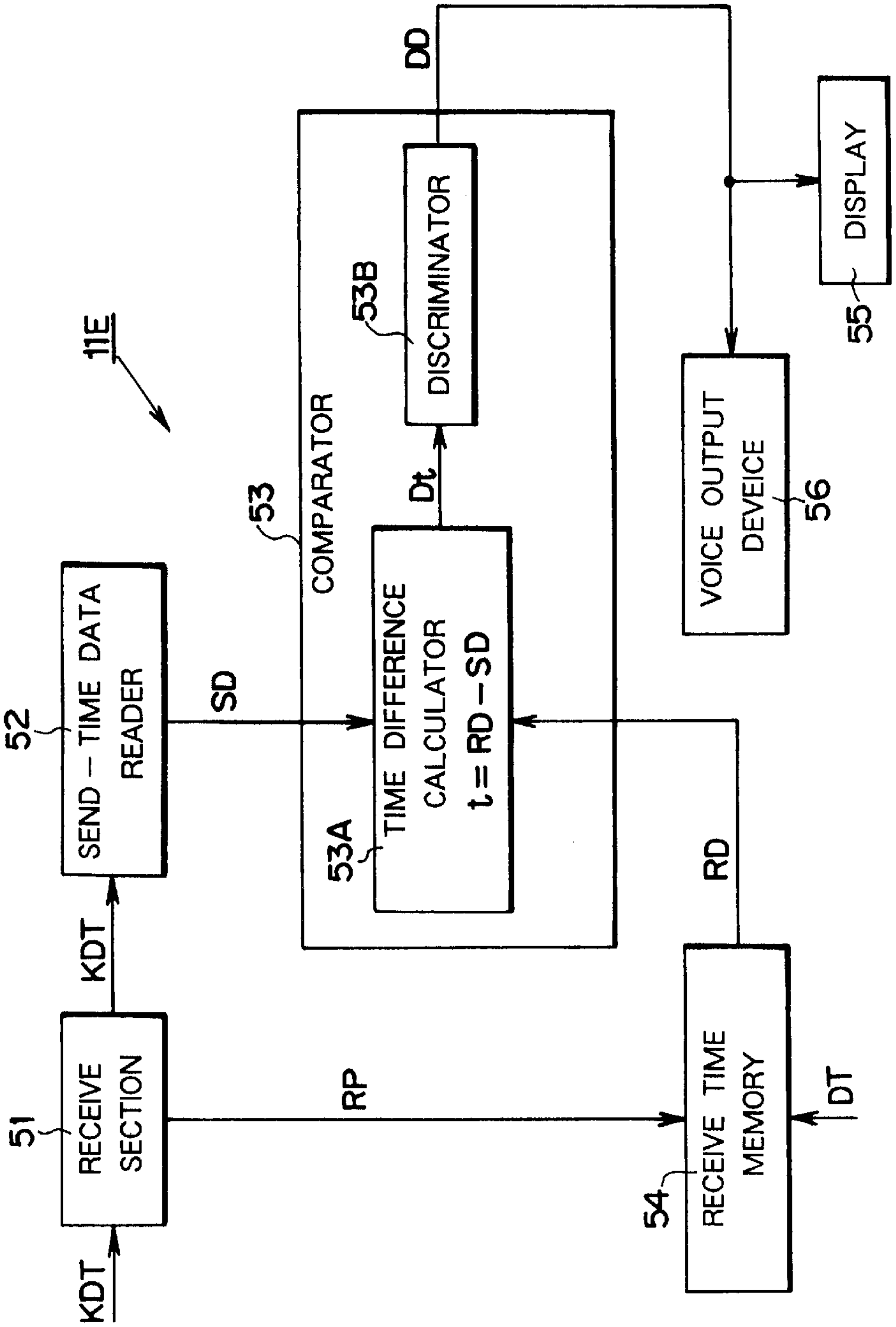
FIG. 5 is a block diagram showing the structural details of a surveillance section shown in FIG. 2.

FIG. 5 is a block diagram showing the surveillance section 11E. Incoming time-stamped data KDT is received by a receive section 51 and forwarded to a send-time data reader 52. The data reader 52 reads the send-time data included in the time-stamped data KDT and sends the read send-time data SD to a comparator 53, specifically to a time difference calculator 53A of the comparator 53.

In addition to the foregoing, the receive section 51 also responds to reception of the received time-stamped data KDT by outputting a receive time pulse RP to a receive time memory 54 that also receives the time data DT from the clock T of the surveillance terminal (master terminal) 1.

When the receive time memory 54 receives the receive time pulse RP, it stores the time data DT at that instant as receive time data RD indicating the time at which the surveillance terminal 1 received the time-stamped data KDT and forwards the receive time data RD to the time difference calculator 53A.

Upon receiving the read send-time data SD and the receive time data RD, the time difference calculator 53A calculates the time difference t between the two and sends time difference data Dt representing the time difference t to a discriminator 53B of the comparator 53.

The discriminator 53B uses the time difference data Dt to discriminate whether the time difference t at that instant is greater than a reference value tr defined in advance. When $t<tr$, the discriminator 53B finds that the data communication delay between the surveillance terminal (slave terminal) that sent the time-stamped data KDT and the surveillance terminal (master terminal) 1 is within the allowable range and, based on this finding, decides that the surveillance terminal (slave terminal) is operating normally.

On the other hand, when $t \geqq tr$, the discriminator 53B finds that the data communication delay between the surveillance terminal (slave terminal) that sent the time-stamped data KDT and the surveillance terminal (master terminal) 1 exceeds the allowable range and, based on this finding, decides that the surveillance terminal (slave terminal) is not operating normally.

Discrimination data DD representing the result of the discrimination by the discriminator 53B as to whether or not the operation of the surveillance terminal (slave terminal) is normal is sent from the discriminator 53B to a display 55. The display 55 produces a visual representation of the result intelligible to the operator. The display can be character display using an LCD panel. Otherwise it can be configured using one or more light-emitting diodes or other such light-emitting elements to visually represent the normal/abnormal result by the on/off state, color or lighting pattern of the elements.

Further, a voice output device 56 responsive to the discrimination data DD for outputting the substance of the discrimination as a voice message or the like can be provided instead of or in addition to the display 55. It is also possible to send the discrimination data DD from the surveillance terminal 1 to the surveillance center 120 via the public telephone circuit network 110. A technician can then be dispatched to correct the problem.

In the foregoing constitution of the security system using sensors, when data transfer is delayed owing to transmission failure or the like caused by a malfunction of the autodial device of a surveillance terminal (slave terminal), the surveillance section 11E discriminates whether or not the data transfer delay exceeds a prescribed value, and when the result is affirmative, sends information to the effect that the security system is faulty to the display 55 and/or the voice output device 56

Unlike conventional security systems, which fail to notice this type of mishap, the security system using sensors according to the present invention can detect such failures with high certainty and, as such, can provide highly reliable security surveillance service.

The function of the comparator 53 of the surveillance section 11E can be implemented by either physical means or software. When the foregoing function of the comparator 53 is implemented using software, a microcomputer is used to execute a prescribed program for this purpose As explained in the foregoing, the security system using sensors according to the present invention is constituted to enable ready assessment of whether or not failure has occurred in the constituent surveillance terminals simply by comparing the send time and receive time of output data from the surveillance terminal. As a result, the security system can be effectively monitored during operation so as to markedly enhance the reliability of security system operation. In addition, time calibration can be efficiently performed among the multiple surveillance terminals at appropriate time intervals using a power-line carrier (PLC) technology. All of the surveillance terminals are therefore able to share accurate time data, so comparison of send time and receive time can be performed with split second accuracy. Moreover, since the time calibration can be optimally performed automatically, labor costs for time calibration can be substantially eliminated and system operating cost markedly reduced.

What is claimed is:

1. A security system using sensors comprising:

multiple surveillance terminals each equipped with a clock and adapted to send security and other data over a power supply line; and a surveillance center for performing security surveillance utilizing security data received from the surveillance terminals, wherein:

at least one surveillance terminal among the multiple surveillance terminals uses the power supply line to send a time calibration signal to required ones of the other surveillance terminals at appropriate times, the surveillance terminals receiving the time calibration signal use the signal to correct their clocks to eliminate time error among the clocks of the multiple surveillance terminals, each surveillance terminal uses the power supply line to send to a prescribed surveillance terminal time-stamped data created by adding to the security and other data it sends send-time data indicating the time at which the data was sent, and the prescribed surveillance terminal discriminates operating states of the surveillance terminals by comparing receive time and send time of time-stamped data.

2. A security system as claimed in claim 1, wherein a standard time data is received in at least one of the multilple surveillancance devices of the securituy system, and the standard time data received is sent over a distribution line to required surveillance devices.

3. A security system as claimed in claim 2, wherein each of said surveillance devices has a power-line carrier transceiver and the standard time data is send through the power-line carrier transceiver to the required surveillances.

4. A security system as claimed in claim 2, wherein a time calibration is performed by overwriting the time data of the clock with the standard time data.

5. A security system as claimed in claim 3, wherein a time calibration is performed by overwriting the time data of the clock with the standard time data.

* * * * *